INFLUENCE OF FURNACE BLACK ON BENZOYL PEROXIDE INITIATED STYRENE POLYMERIZATION 1.1 PHR BENZOYL PEROXIDE INITIATED STYRENE POLYMERIZATION WITH CHANNEL BLACK 1.1 PHM BENZOYL PEROXIDE INITIATED STYRENE POLYMERIZATION WITH SUPER ABRASION FURNACE BLACK

INVENTOR.
GERARD KRAUS
BY Hudson and Young.
ATTORNEYS

United States Patent Office 2,993,903
Patented July 25, 1961

2,993,903
POLYMERIZATION INHIBITION
Gerard Kraus, Bartlesville, Okla., assignor to Phillips Petroleum Company, a corporation of Delaware
Filed May 14, 1959, Ser. No. 813,216
17 Claims. (Cl. 260—290)

This invention relates to the inhibition of polymerization of monomers which are polymerized by free radical mechanism.

An object of this invention is to provide a method for inhibiting polymerization of polymerizable monomers. A further object of this invention is to provide a method which is simple and inexpensive for inhibiting polymerization of monomers such as butadiene and styrene. A further object of this invention is to provide a method for inhibiting polymerization of monomers which is effective during storage but which does not affect polymerization when polymerization is desired.

Figure 3:
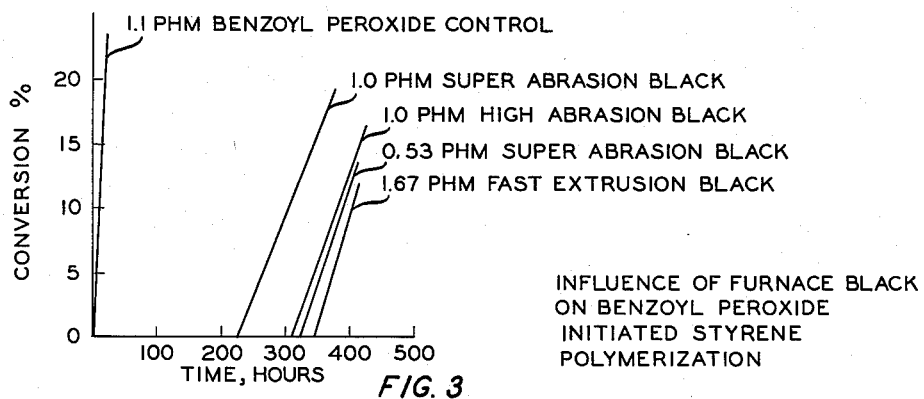
Figure 2:
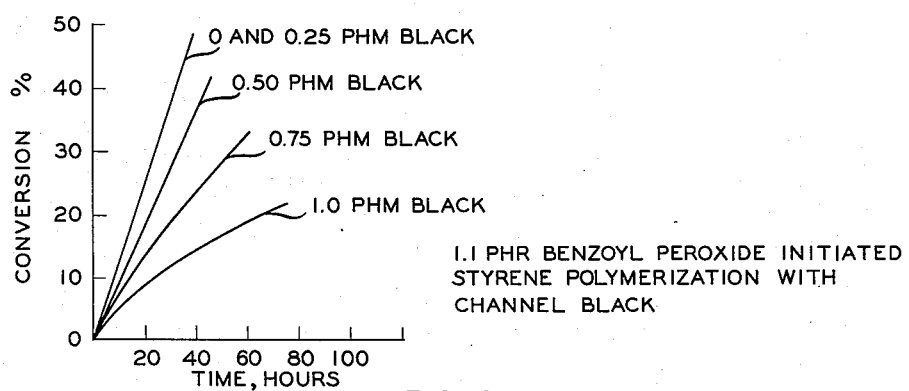
Figure 1:
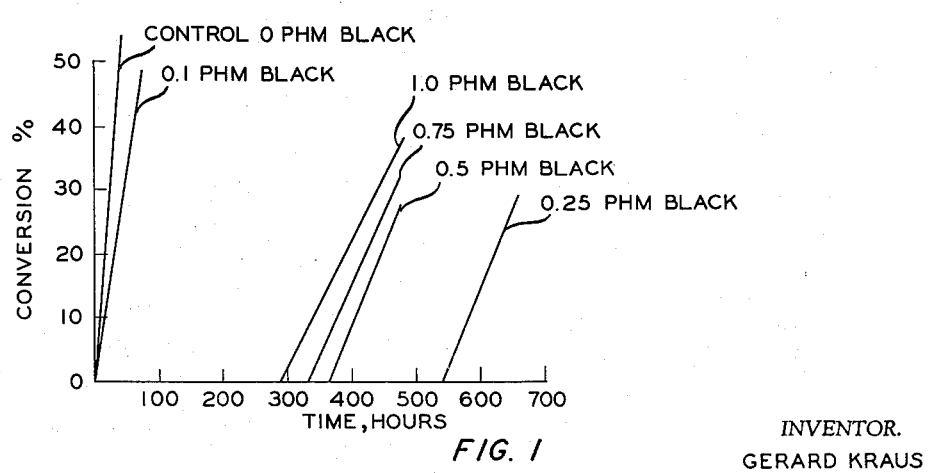

Other objects and advantages of my invention will be apparent to one skilled in the art upon reading this disclosure which includes a drawing comprising FIGURES 1, 2 and 3 which show, in graphical form, the polymerization results obtained in Example I of the disclosure.

I have discovered that furnace black employed in conjunction with organic peroxides or oxygen inhibit the polymerization of monomers that undergo polymerization by free radical mechanisms. The inhibiting effect is specific to furnace blacks used with organic peroxides, hydroperoxides, and oxygen. When channel blacks are substituted for furnace blacks and used under the same conditions, polymerization is retarded but not inhibited. The inhibiting effect observed when furnace black is employed in conjunction with oxygen or peroxides is greater than when either material is used separately.

Organic peroxides and hydroperoxides have been employed as polymerization initiators while oxygen is known to inhibit polymerization. Carbon black has also been used to inhibit polymerization. It is surprising to find that when either an organic peroxide or oxygen is employed in conjunction with furnace black, the polymerization of polymerizable monomers is inhibited, i.e., very long induction periods are observed and they are much longer than when a furnace black alone is used. A very noticeable retardation in polymerization rate results when channel black is used in place of furnace black, but there is no induction period which is indicative of inhibition. The role of furnace black in this inhibiting system is, therefore, specific. By furnace black I mean carbon black produced by decomposition of oil or gas in the presence of combustion gases in special furnaces. The combustion gases are obtained by burning a portion of the conversion stock or by combustion of a different fuel to furnish combustion gases. The blacks recovered in the furnace process generally have a pH above 7 and a surface area of at least 20 square meters per gram. Such black is sometimes called furnace combustion black.

The amount of furnace carbon black used in the inhibiting systems of this invention will generally range from 0.1 to 15 parts by weight per 100 parts monomer, preferably from 0.15 to 10 parts. The amount of oxygen or organic peroxide or hydroperoxide will generally range from 0.08 to 35 millimoles per gram of furnace black with the preferred range being from 0.08 to 25 millimoles per gram of furnace black. Any of the furnace blacks are applicable in this invention. Included in the list of blacks are SRF (semireinforcing furnace), HAF (high abrasion furnace), SAF (super abrasion furnace), and ISAF (intermediate SAF). Furnace blacks which are particularly effective are Philblack O (HAF), Philblack E (SAF), Philblack I (ISAF), and Philblack A (fast extruding furnace black).

Any of the organic peroxides and hydroperoxides which have been employed as polymerization initiators are applicable in the inhibiting systems of this invention.

In general, two groups of organic peroxides can be used, those having the formula ROOH, known as hydroperoxides or hydroperoxymethanes, and those having the formula ROOR, where R in each instance is an organic radical. The hydroperoxides can be represented by the formula RR'R"COOH wherein R is selected from the group consisting of hydrogen and organic radicals, and each of R' and R" is an organic radical, or R'R" together comprise a tetramethylene or pentamethylene group forming with the R—COOH a cyclopentyl- or cyclohexyl-hydroperoxide. Each of R, R' and R" can be completely hydrocarbon in character, and can be of mixed character, such as aralkyl, alkaryl, and the like, and can also have non-hydrocarbon substituents, such as oxygen in the form of hydroxy and ether compounds, sulfur in similar compounds (i.e. mercapto compounds and thioethers), and halogen compounds. Examples of such hydroperoxides includes diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl (ethoxyphenyl) hydroperoxymethane, methldecyl (methylphenyl)hydroperoxymethane, dimethldecl-hydroperoxymethane, methylchlorophenyl-phenylhydroperoxymethane, and tertiary-butylisopropylbenzene hydroperoxide(dimethyl(tertiary-butylphenyl)hydroperoxymethane).

One large group of these hydroperoxymethanes is that group in which each of the three substituent groups is a hydrocarbon radical. One of the subgroups of these compounds is the alkaryl-dialkyl hydroperoxymethanes, in which the two alkyl groups are relatively short, i.e., have from one to four carbon atoms each, including dimethyl(tertiary - butylphenyl)hydroperoxymethane, dimethyl(diisopropylphenyl)hydroperoxymethane, dimethyl (isopropylphenyl) hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds such as 1-phenyl-3-methyl-3-hydroperoxybutane, can also be considered to be members of this group. A further subgroup includes alkyldiaryl compounds, such as methyldiphenylhydroperoxymethane, methylphenyltolyhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,10a-octahydrophenanthrene, which forms the corresponding hydroperoxide upon oxidation, etc. The peroxides include such compounds as benzoyl peroxide, dicumyl peroxide, di-tert-butyl peroxide, and 2,4-dichlorobenzoyl peroxide. Organic peroxides and hydroperoxides preferably will have a total of not more than thirty carbon atoms per molecule. Mixtures of these peroxides and/or hydroperoxides can be used, as desired.

The monomeric material to which the inhibitor can be added in using this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, vinylnaphthalene and similar derivatives thereof, and the like; acrylic acid and derivatives thereof such as methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene, 2-vinylpyridine, 2-vinylquinoline, 2-methyl-5-vinylpyridine and other unsaturated hydrocarbons, esters, alcohols, acids, ethers, etc., of the types described.

It is particularly noteworthy that polymerization can be inhibited with very small amounts of carbon black and peroxide or oxygen. The invention is not dependent upon any particular mechanism for the inhibiting action. In instances where oxygen is employed in the system, it is possible that a peroxide is formed in situ which then cooperates in some way with furnace black to inhibit polymerization.

The method of my invention is especially suitable because there is no adverse effect on the monomers when polymerization is desired. The carbon black can be easily filtered from the monomer, this leaving the monomer containing the oxygen-containing catalyst. Polymerization can then be carried out by adding the rest of the polymerization system including, if necessary, an additional quantity of a peroxide or hydroperoxide catalyst.

The invention is not broad to all free radical initiators. For instance, runs with azo-bis-isobutyronitrile and furnace blacks did not give long induction periods.

An important feature of my invention is that polymerization, after the induction period is not retarded but progresses at only a slightly lower rate as when no black is used.

The following examples illustrate specific embodiments of my invention:

Example I

Freshly distilled styrene was charged into 7-ounce beverage bottles along with 1.1 p.h.m. (parts per hundred parts monomer) of benzoyl peroxide, and an evacuated thin-walled ampule containing the desired amount of degassed super abrasion furnace black (Philblack E) was dropped through the neck of each bottle. The carbon black was benzene extracted in a Soxhlet apparatus for 72 hours prior to use. The space above the monomer was purged with purified nitrogen and the bottle capped. The ampules were broken by vigorous shaking of the closed bottles. Polymerization was carried out at 50° C. One run was made in which no carbon black was used. Variation in induction period with variable amounts of black is shown below and also in FIGURE 1.

| Philblack E, p.h.m. | Benzoyl Peroxide/Black Wt. Ratio | Benzoyl Peroxide/Black Mmoles/g. Black | Induction Period, Hours |
|---|---|---|---|
| 0 | | | 0 |
| 0.10 | 11:1 | 45.5:1 | 2 |
| 0.25 | 4.4:1 | 18.2:1 | 540 |
| 0.50 | 2.2:1 | 9.1:1 | 360 |
| 0.75 | 1.5:1 | 6.1:1 | 330 |
| 1.00 | 1.1:1 | 4.6:1 | 290 |

When channel black (Wyex) was used instead of Philblack E, the polymerization was retarded but no induction period was observed. Results of variable quantities of channel black with 1.1 parts of benzoyl peroxide per 100 parts of monomers is shown in FIGURE 2.

The effect of different furnace blacks with 1.1 parts of benzoyl peroxide per 100 parts of monomers is shown in FIGURE 3. These data demonstrate the difference between furnace blacks and channel black in conjunction with benzoyl peroxide for inhibiting the polymerization of styrene.

Example II

The synergistic effect of oxygen and Philblack E in inhibiting the polymerization of styrene at 50° C. is shown by the following data:

| | Bottle | | | | | |
|---|---|---|---|---|---|---|
| | 1 | 2 | 3 | 4 | 5 | 6 |
| Philblack E, p.h.m. | | | | 1.0 | 1.0 | 1.0 |
| Oxygen, cc./100 cc. styrene | | 2 | 8 | | 2 | 8 |
| Oxygen, mmoles/gram black | | | | | 0.088 | 0.352 |
| Induction period, hours | 4 | 7 | 28 | 79 | 104 | 120 |

Oxygen was injected into bottles charged in the manner described in Example I. These data show that the induction period in run 5 is greater than the total effect of oxygen and Philblack E shown in runs 2 and 4. Likewise the induction period in run 6 is greater than the sum of the effects in runs 3 and 4. It is thus seen that even with a very small quantity of oxygen, a very noticeable improvement is realized.

Example III

Freshly distilled 2-methyl-5-vinylpyridine was charged to three 6-ounce bottles, variable amounts of high abrasion furnace black (Philblack O) were added for two runs (one was reserved for a control), and the bottles were capped. The space above the monomer was filled with air. The bottles were allowed to stand two weeks under subdued lighting conditions after which they were opened and analyzed for polymer content. Two methods of analysis were used. One procedure involved precipitation in n-hexane, decanting of the supernatant liquid, and drying and weighing of the polymer. In the other procedure the unreacted monomer was evaporated and the residue was weighed. Results were as follows:

| | 1 | 2 | 3 |
|---|---|---|---|
| 2-Methyl-5-vinylpyridine, ml | 50 (47.7 g.) | 50 (47.7 g.) | 50 (47.7 g.) |
| Philblack O, grams | | 1 | 4 |
| Grams Philblack O/100 grams MVP | | 2.1 | 8.4 |
| Oxygen, millimoles/gram black [1] | | 0.5 | 0.12 |
| Percent Polymer: | | | |
| By precipitation | 14.7 | <0.05 | <0.10 |
| By evaporation | 15.6 | <0.10 | <0.12 |

[1] There was approximately one millimole of oxygen present above the surface of the materials in each bottle. The millimoles oxygen/gram of black was calculated using this figure.

As many possible embodiments can be made of this invention without departing from the scope thereof, it is to be understood that all matter herein set forth is to be

I claim:

1. A composition of matter consisting essentially of an unsaturated monomer of the benzene and pyridine series containing the vinylidene group and free of other substituents not inert in the reaction, 0.1 to 15 parts by weight of furnace carbon black per 100 parts of the monomer and, per gram of said black, 0.08 to 35 millimoles of a material selected from the group consisting of molecular oxygen gas, organic peroxides, and organic hydroperoxides.

2. A composition of matter consisting essentially of an unsaturated monomer of the benzene and pyridine series containing the vinylidene group and free of other substituents not inert in the reaction, 0.1 to 10 parts by weight of furnace carbon black per 100 parts of the monomer and, per gram of said black, 0.08 to 35 millimoles of a material selected from the group consisting of molecular oxygen gas, organic peroxides, and organic hydroperoxides.

3. The composition of claim 1 wherein said black is semireinforcing furnace black.

4. The composition of claim 1 wherein said black is high abrasion furnace black.

5. The composition of claim 1 wherein said black is super abrasion furnace black.

6. The composition of claim 1 wherein said black is intermediate super abrasion furnace black.

7. The composition of claim 1 wherein said black is fast extruding furnace black.

8. The composition of claim 1 wherein said molecular oxygen gas containing material is oxygen.

9. The composition of claim 1 wherein said oxygen containing material is benzoyl peroxide.

10. The composition of claim 1 wherein said oxygen containing material in cumene hydroperoxide.

11. The composition of claim 1 wherein said oxygen containing material is dicumyl peroxide.

12. The composition of claim 1 wherein said oxygen containing material is tetralin hydroperoxide.

13. The composition of matter consisting essentially of styrene, 0.1 to 15 parts by weight of furnace carbon black per 100 parts of styrene and, per gram of said black, 0.08 to 35 millimoles of benzoyl peroxide.

14. A composition of matter consisting essentially of styrene, 0.1 to 15 parts by weight of furnace carbon black per 100 parts of furnace styrene and, per gram of said black, 0.08 to 35 millimoles of molecular oxygen gas.

15. A composition of matter consisting essentially of 2-methyl-5-vinylpyridine, 0.1 to 15 parts by weight of furnace carbon black per 100 parts of 2-methyl-5-vinylpyridine and, per gram of said black, 0.08 to 35 millimoles of molecular oxygen gas.

16. A composition of matter consisting essentially of an unsaturated monomer of the benzene and pyridine series containing the vinylidene group and free of other substituents not inert in the reaction, 0.1 to 15 parts by weight of carbon black having a pH above 7 and a surface area of at least 20 square meters per gram and, per gram of said black, 0.08 to 35 millimoles of a material selected from the group consisting of molecular oxygen gas, organic peroxides, and organic hydroperoxides.

17. A composition of matter consisting essentially of an unsaturated monomer of the benzene and pyridine series containing the vinylidene group and free of other substituents not inert in the reaction, 0.1 to 10 parts by weight of carbon black having a pH above 7 and a surface area of at least 20 square meters per gram and, per gram of said black, 0.08 to 35 millimoles of a material selected from the group consisting of molecular oxygen gas, organic peroxides, and organic hydroperoxides.

References Cited in the file of this patent

Moynihan: Chem. Abstracts, vol. 51, col. 7050 (1957).